United States Patent [19]

Janko et al.

[11] Patent Number: 4,735,368
[45] Date of Patent: Apr. 5, 1988

[54] WASTE TREATMENT APPARATUS

[75] Inventors: Richard M. Janko, Cleveland; Robert J. Zelinski, Richfield; Ronald C. Shawl, Fremont, all of Ohio

[73] Assignee: Chemical Waste Management, Inc., Oak Brook, Ill.

[21] Appl. No.: 937,159

[22] Filed: Dec. 2, 1986

[51] Int. Cl.⁴ .............................................. B02C 19/00
[52] U.S. Cl. ...................................... 241/69; 209/358; 209/916; 241/101.2; 241/DIG. 38; 414/412
[58] Field of Search ...................... 414/412; 241/101.4, 241/24, 101.3, 69, 101.5, 79, DIG. 38, 101.2; 209/358, 3, 4, 389, 908, 916

[56] References Cited

U.S. PATENT DOCUMENTS 3,294,264 12/1966 Everington .......................... 414/412
3,682,341 8/1972 Happel ................................ 414/412
4,217,072 8/1980 Bostrom .............................. 414/412

Primary Examiner—Mark Rosenbaum
Attorney, Agent, or Firm—Sughrue, Mion, Zinn, Macpeak, and Seas

[57] ABSTRACT

An apparatus for treating waste material contained in drums comprises a conveyor for moving said drums to a purging chamber having an inlet door and outlet door, a conveyer in said purging chamber for moving said drums through said outlet door, a conveyer outside said purging chamber for moving said drums to a shear station where the bottom lids of the drums are sheared off, a compactor chamber for receiving and compacting said drums and extruding said waste materials therein, and a sorter for sorting the waste materials into liquid and solid components and conveying said sorted liquids and solids to respective storage facilities.

13 Claims, 5 Drawing Sheets

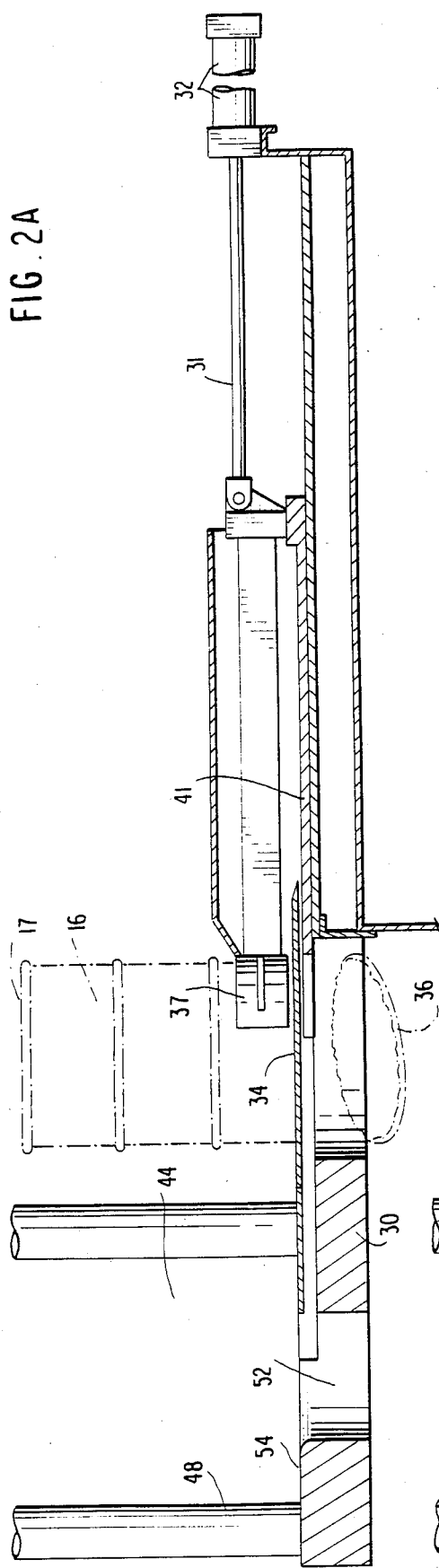
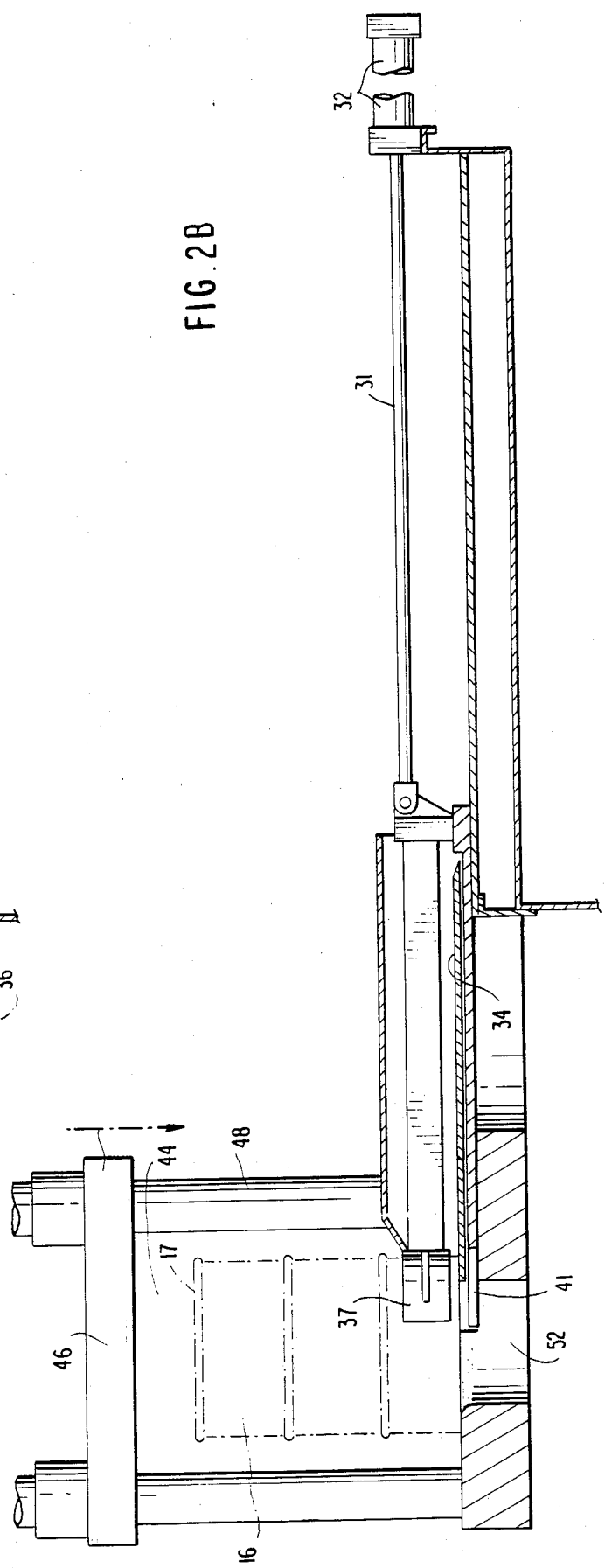

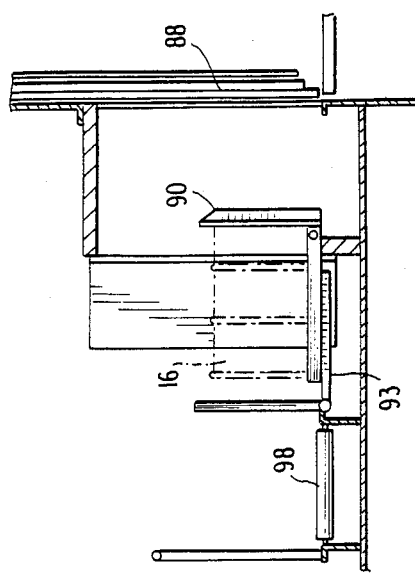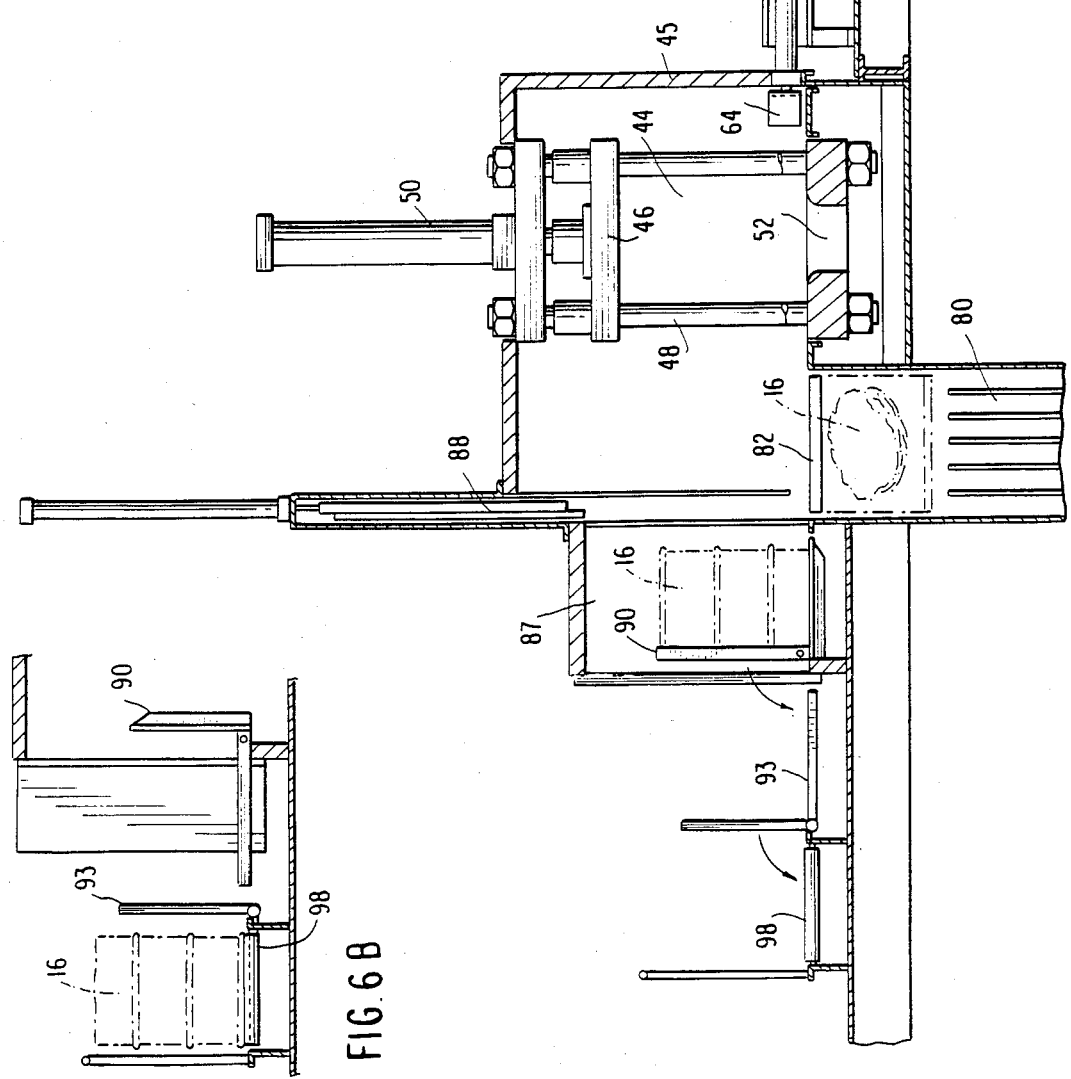

ns for the separation of waste material stored in industrial drums. More specifically, drums of waste material are opened by shearing and the contents extruded therefrom are deposited in a sorter where liquids, sludge and trash are separated and thereafter transported to storage and disposal.

2. Description of the Prior Art

The prior art discloses methods and apparatus for the treatment of waste materials by sorting or pulping.

U.S. Pat. No. 4,341,353 discloses a method and apparatus for recovering fuel from refuse by utilizing disk screens. The various components of the refuse are separated by passing the refuse through a disk screen wherein crushed glass and other fine material are removed. The remaining refuse is then separated into light and heavy fractions in an air classifier. U.S. Pat. No. 4,264,352 also discloses a solid waste treatment system wherein heavy inorganic materials are segregated and removed for recycling purposes. A pug-mill is utilized to add moisture prior to digestion and maceration. U.S. Pat. No. 3,790,091 shows a method for separating solid waste material into components by recycling the solid waste materials through reducing devices to reduce the waste to uniform particle size and thereafter separating the particles by weight, size and magnetic properties.

The prior art does not disclose the concept of shearing a large industrial drum and extruding the contents into a sorter where liquid/sludge and solid trash components are separated and then transported to storage and landfill, respectively.

SUMMARY OF THE INVENTION

There is a need for an apparatus for transporting and shearing large industrial drums containing waste material and thereafter separating the waste material into liquid/sludge and solid trash components for disposal of the organic and inorganic materials and storage of liquids and sludges.

It is therefore a primary object of this invention to provide an apparatus which will transport large industrial drums containing waste materials to a shearing station where an end of the drum is sheared whereby the contents of the drum are removed.

It is another object of this invention to provide a chamber for compacting and extruding waste material from large industrial type drums.

It is still another object of this invention to provide a separator for the waste materials wherein the waste materials are separated into liquid/sludge and trash components which are conveyed to separate locations for further treatment.

And yet another object of this invention is to provide a discharge compartment for disposing of drums which cannot be compacted.

These and other objects of the invention will become apparent from a reading of the following specification when taken in light of the annexed drawings.

BRIEF DESCRIPTION OF THE DRAWINGS

FIG. 2A is a perspective view of the shearing of a drum.

FIG. 2B is a perspective view in section of a drum being moved into a compaction chamber.

FIG. 6 is a perspective view in section of a disposal chute for compacted drums and a rejected station for rejected drums.

FIG. 6A is a perspective view in section showing down turning of a partially compacted drum.

FIG. 6B is a perspective view in section showing uprighting of a partially compacted drum.

DESCRIPTION OF THE PREFERRED EMBODIMENT OF THE INVENTION

Figure 1:
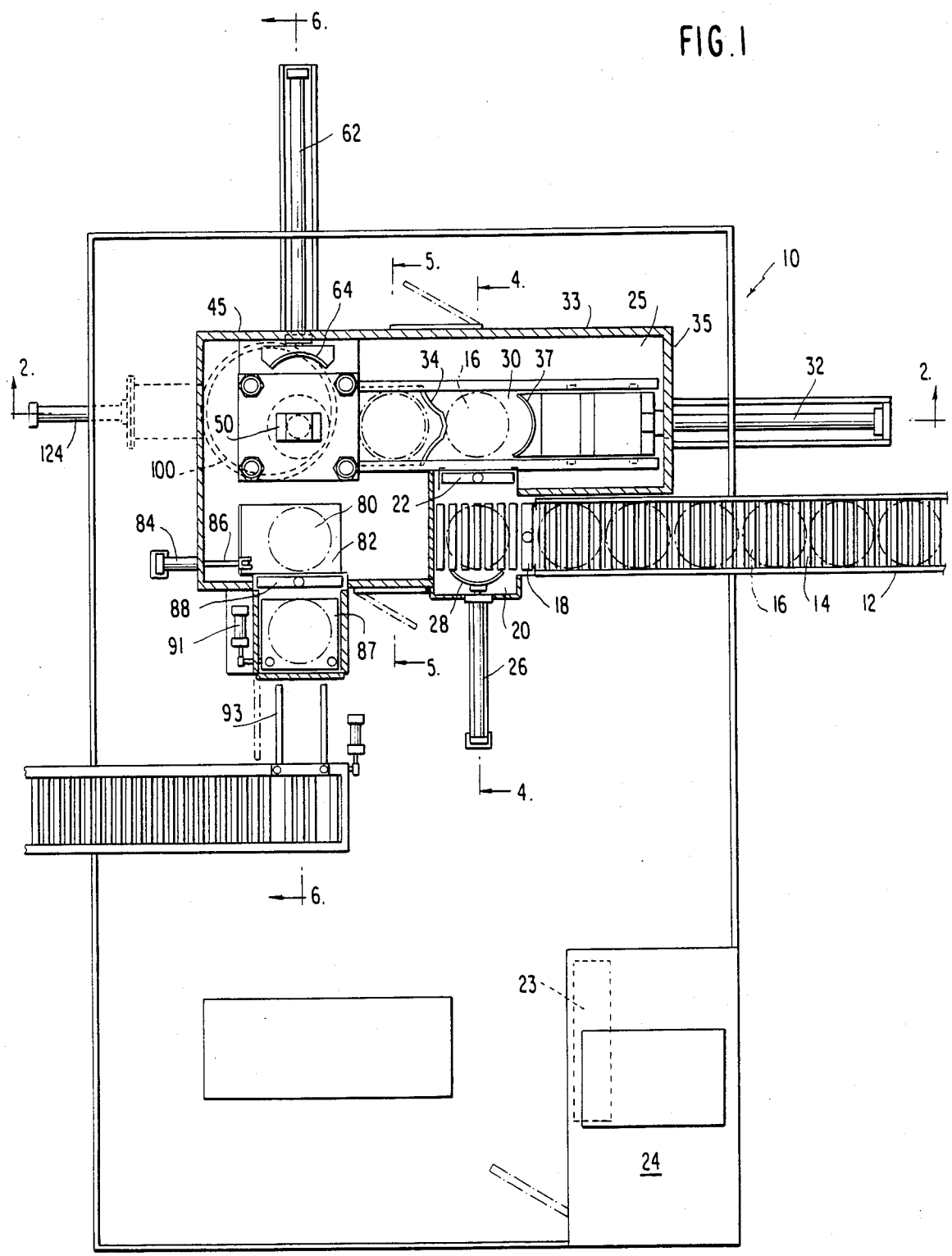
FIG. 1 is a plan view of the apparatus showing drum conveying apparatus, shearing of drums and compacting of drums.

Referring now in more detail to the drawings, FIG. 1 shows a frame 10 which supports the components of the apparatus including a bridge 12 on which there is a conveyer 14 for transporting drums 16 having been placed on the bridge by suitable means. Each drum 16, in sequence, passes through an inlet door 18 of a purge compartment 20 having a discharge door 22. Both doors are air lock operated by controls on panel 23 located inside housing 24 which houses all controls for the system. An inert gas is used to purge compartment 20 of substantially all its air. At a predetermined level of oxygen in the compartment 20, the inert gas purge is stopped. The outlet door 22 is opened and the drum 16 is moved into housing 25 by piston 26 having a drum engaging end 28 in the form of a semicircle which encircles a portion of the outside of the drum 16.

Figure 5:
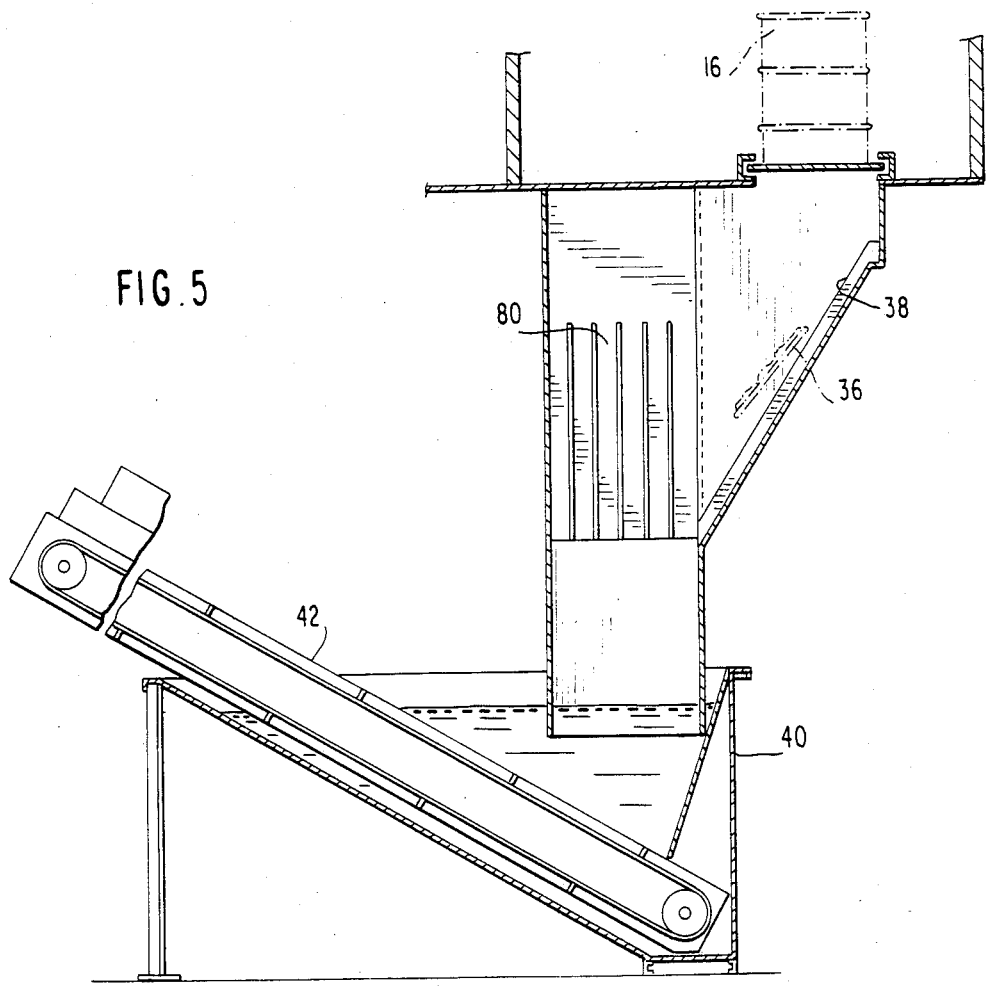
FIG. 5 is a perspective view in section showing disposal of sheared lids and compressed carcasses to a holding tank with conveyer therein.

The drum 16 is moved onto a platform 30 in housing 25 which is enclosed by sidewall 33, end wall 35 and a roof 39, FIG. 1. The wall 35 has means to permit passage of the cylinder 32 which has on the end of its piston 31 a drum engaging pusher 37 contoured to partially encircle the drum 16. Forward of the drum 16 and positioned above platform 30 is a shear blade 34 over which the drum 16 passes upon forward movement of the piston 31 which is programmed to perform this function at predetermined sequence intervals. A drum bottom engaging plate 41 moves with pusher 37 and passes beneath the shear blade 34 as the drum is advanced through the shear blade 34. As the drum passes completely through the shear blade 34, FIGS. 2A and 2B, the bottom lid 36 is completely removed is pushed forward by the plate 41 and falls by gravity into chute 38, FIGS. 2 and 5, which carries the severed lid into a conveyer seal 40 having a conveyer 42 therein. It will be appreciated that the shear blade 34 may be hydraulically operated to shear the drum lids. The sheared drums are moved sequentially into compacting chamber 44 having a compactor 46 movable on supports 48 by a cylinder 50, FIG. 6. The chamber 44 has an opening 52 in the floor 54 which permits passage of the extruded materials.

The compactor 46 is operated whereby it moves downwardly and engages the top 17 of the drum 16. As the compactor continues downwardly, the drum 16 is compressed whereby the contents thereof are extruded and pass through the opening 52 and into a sorter 60 directly therebelow, FIG. 2. The wall 45 of chamber 44 has means to permit passage of the piston 62 having a drum engaging member 64 which is formed to partially encircle the drum 16. After the drum 16 has been compacted and the contents extruded, the piston 62 is operated whereby drum engaging member 64 engages the compressed drum and moves it to chute 80, FIG. 6. The chute 80 may be closed by a plate 82 which is operated by a raising and lowering mechanism 84 having a plate engaging arm 86. The chute 80 is normally open to receive the compressed drum carcass which falls into the conveyor seal 40. In the event of a problem in compacting a drum, the downward action of the piston 50 is stopped and returned to its uppermost position. At the same time, the plate 82 is moved by piston 84 having a plate engaging arm 86 to close the chute 80. The piston 62 is operated to push the partially compacted drum 16 onto the plate 82 which is adjacent a compartment 87 having an airlock door 88 which is automatically opened upon onset of an emergency, e.g., failure of the compactor to completely compress a drum. The partially compacted drum is then moved into the chamber 87 and onto the pivotable drum engaging support 90. The door 88 is closed, FIG. 6A, and the system reset to continue operation without excessive downtime. The operator then attends to removal of the drum by a 180° turnover mechanism 91, FIG. 1, which functions to pivot support 90 to the position shown in FIG. 6A. A 180° turnover device 93 turns the drum upright until it rests on conveyer 98, FIG. 6B. Thereafter, the drums are transported off the system.

Figure 2:
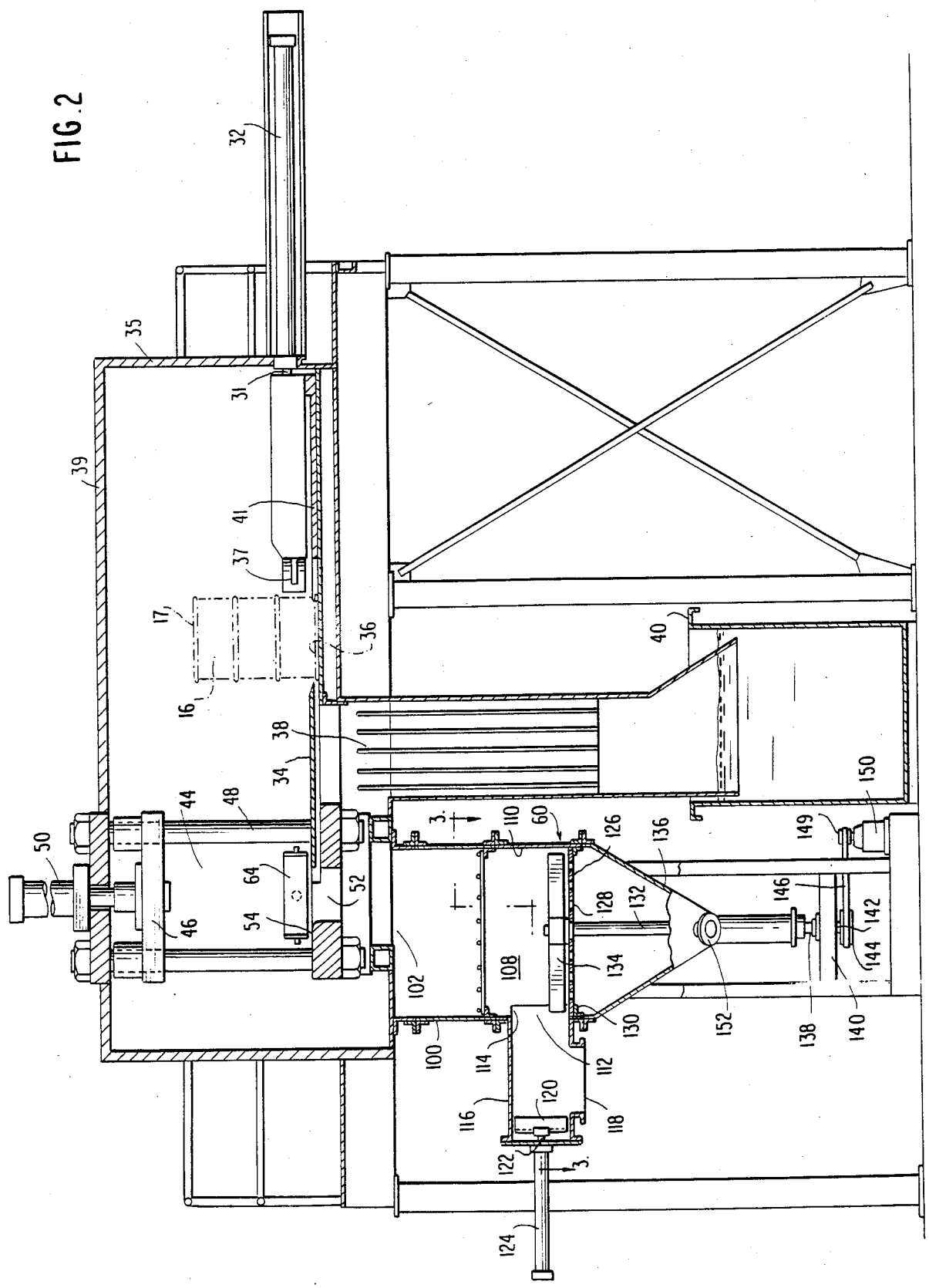
FIG. 2 is a view in section of the apparatus as seen in FIG. 1.
Figure 3:
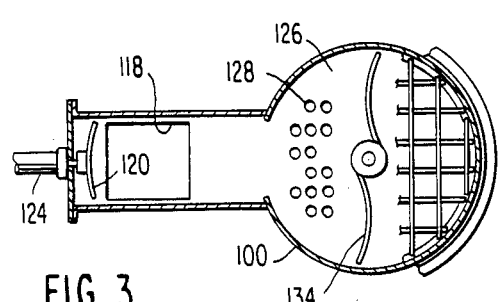
FIG. 3 is a plan view of the sorting chamber.
Figure 4:
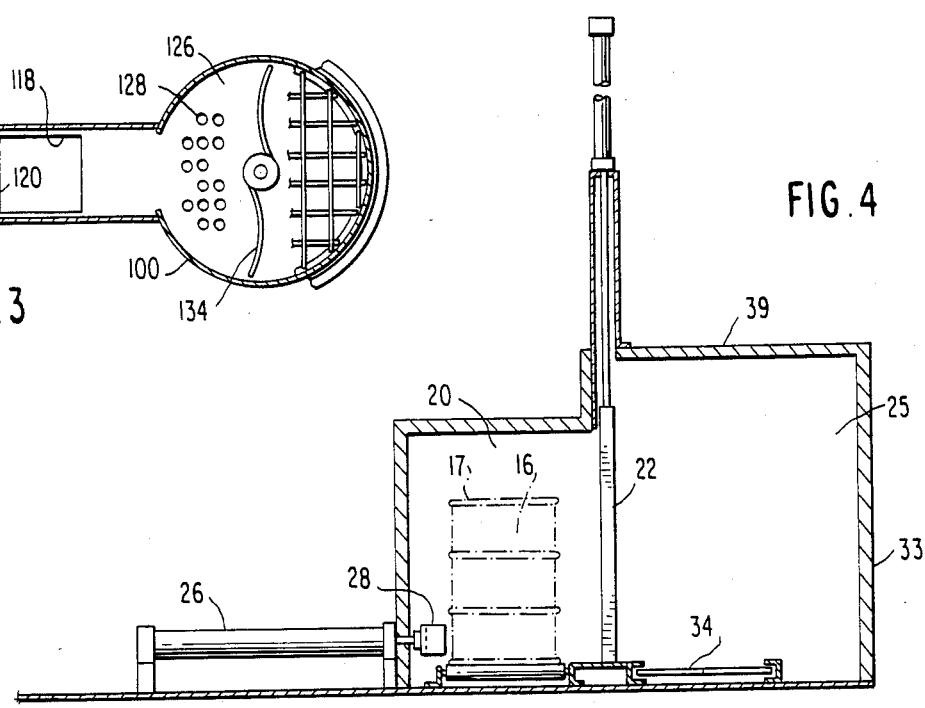
FIG. 4 is a perspective view in section of a drum purging chamber.

The sorter 60 comprises an upper section 100 having an open end 102 to receive the contents issuing through opening 52. The sorting chamber 108 has a continuous wall 110, broken at 112 to form an opening in which there is received the open end 114 of a valve housing 116. The valve housing 116 has an open port 118 which is closed by moving valve gate 120 into the open end 112 at the same time closing opening 112. The valve gate 120 is attached to a rod 122 which moves in cylinder 124. The operation may be manual or automatic. The floor 126 of the sorting chamber 108 has a series of perforations 128 and rests on a continuous flange 130. A large perforation in the center of the floor permits passage of the rotatable shaft 132 having a blade 134 on the end thereof. The blade 134 is just slightly above the floor 126 and is smaller than the diameter of the chamber 108. The shaft 132 extends downwardly through a frustoconical lower housing 136 having an opening at the bottom end thereof for passage of the end 138 of the shaft 132 which is journaled in a support member 140. The outer extremity 142 of the shaft 132 has a pulley 144 cooperating with a pulley belt 146 which is attached to the pulley wheel 149 of a motor 150. The frustoconical housing 136 has an exit port 152 which may or may not be opened and closed by a valve gate. Liquid and sludge materials from the compacted drums pass through the perforations in the floor 126 by the slowly clockwise moving blade 134 and then through the port 152 for transportation to storage tanks. The solid objects such as metal and debris from the compacted drums collect on the perforated floor 126. When a sufficient quantity of solid objects has collected on the floor 126, the port 118 is opened by moving the gate valve 120 to a position left of the port opening 118 as shown in FIG. 2 and the motor 150 is reversed whereby the blade 134 turns counterclockwise thus ejecting the solid objects out opening 112 of the sorting chamber 108. The solid objects thus ejected fall through the port opening 118 and into a dumpster positioned there below.

While the invention has been described in respect of a preferred embodiment thereof, it will be appreciated to those skilled in the art to which the invention pertains that numerous changes may be made in the system without departing from the spirit and scope thereof.

What I claim is:

1. A waste treatment apparatus for separating liquid/sludge and solids components of waste materials, comprising:
    first conveyer means for conveying upright large industrial-type drums containing waste materials including said liquid/sludge component and said solids component;
    a purging chamber for receiving said upright drums from said first conveyer means, said purging chamber having an inlet door and an outlet door;
    second conveyer means within said purging chamber for conveying said upright drums therefrom;
    third conveyer means outside said purging chamber for conveying said upright drums to shear means and to compactor means;
    shear means, disposed in the path of said third conveyer means, for shearing off only the bottom lids of said upright drums being conveyed by said conveyer means;
    compactor means for compacting said sheared drums received from said shear means, each drum being a cylinder, and the compaction being in the direction of the cylindrical axis, whereby the waste materials are extruded from the bottom of said upright drums; and
    sorting means for receiving said extruded waste materials and for separating them into a liquid/sludge waste component and a solid waste component.

2. A waste treatment apparatus as defined in claim 1, wherein:
    said shear means is fixed, and each drum is moved thereagainst by said third conveyer means, whereby the lid of the drum is sheared off.

3. A waste treatment apparatus as defined in claim 2, wherein:
    said compactor means has a chamber for receiving said drums, an outlet adjacent the open end of a sheared drum, and a compactor head for compacting said sheared drum, whereby the waste materials therein are extruded through said outlet.

4. A waste treatment apparatus as defined in claim 3, wherein:
    said sorting means comprises a housing which is located beneath said compactor means and which has separator means for separating the waste materials from said drums into solid and liquid/sludge components, and which has discharge means for discharging said solid and liquid/sludge waste components to separate storage containers, respectively.

5. A waste treatment apparatus as defined in claim 4, wherein:
    said separator means comprises a perforated floor which permits passage of liquids and sludge and blocks passage of solids which thereby collect on said floor.

6. A waste treatment apparatus as defined in claim 5, wherein said discharge means comprises:
    valve means for controlling the discharge of solids collected on said perforated floor and having a normally closed discharge port;

valve-controller means for opening said discharge port when a predetermined amount of solids has collected on said perforated floor; and means for moving said collected solids from said floor to said open discharge port.

7. A waste treatment apparatus as defined in claim 5, further comprising chute means, disposed beneath said shear means, for receiving the sheared lids.

8. A waste treatment apparatus as defined in claim 7, further comprising:

a water-containing tank beneath said chute means for receiving said sheared lids.

9. A waste treatment apparatus as defined in claim 8, further comprising:

a conveyer in said compactor for moving the compacted drums therefrom; and chute means for directing said compacted drums into a water-containing tank.

10. A waste treatment apparatus as defined in claim 4, further comprising:

drum receiving chamber means, disposed downstream of said compactor means, for receiving only partially compacted drums ejected from said compactor; and fourth conveyer means for moving said partially compacted drums away from said apparatus.

11. A waste treatment apparatus as defined in claim 13, further comprising piston-and-cylinder means for ejecting said only partially compacted cans onto said fourth conveyer means.

12. A waste treatment apparatus as defined in claim 11, wherein said third conveyer means comprises:

can-pushing means engaging each can at a point above said shear means and passing above said shear means; and plate means, engaging each can at a point below said shear means and passing below said shear means, for pushing the sheared-off lid into a discharge chute.

13. A waste treatment apparatus as defined in claim 3, wherein:

said shear means is movable to shear the lids of said drums.

* * * * *